United States Patent [19]

Schmitt

[11] Patent Number: 4,506,115
[45] Date of Patent: Mar. 19, 1985

[54] MESSAGE ALERT SYSTEM

[75] Inventor: Paul M. Schmitt, Needham, Mass.

[73] Assignee: GTE Communications Products Corporation, Waltham, Mass.

[21] Appl. No.: 530,935

[22] Filed: Sep. 12, 1983

[51] Int. Cl.³ .............................................. H04M 1/64
[52] U.S. Cl. .................................. 179/84 C; 179/84 L; 179/81 C
[58] Field of Search ................. 179/84 C, 84 R, 81 R, 179/2 A, 2 C, 2 DP, 2.51, 81 C, 84 L

[56] References Cited

U.S. PATENT DOCUMENTS 3,934,098 1/1976 Merritt, Jr. ........................ 179/84 C
3,937,889 2/1976 Bell et al. ......................... 179/2 DP Primary Examiner—Gene Z. Rubinson
Assistant Examiner—James L. Dwyer
Attorney, Agent, or Firm—J. Stephen Yeo

[57] ABSTRACT

A lamp is provided on a telephone handset to notify the user that a message is waiting. The lamp is energized by a 1 hertz square wave obtained by demodulating a high frequency carrier sent from a transmitter.

1 Claim, 3 Drawing Figures

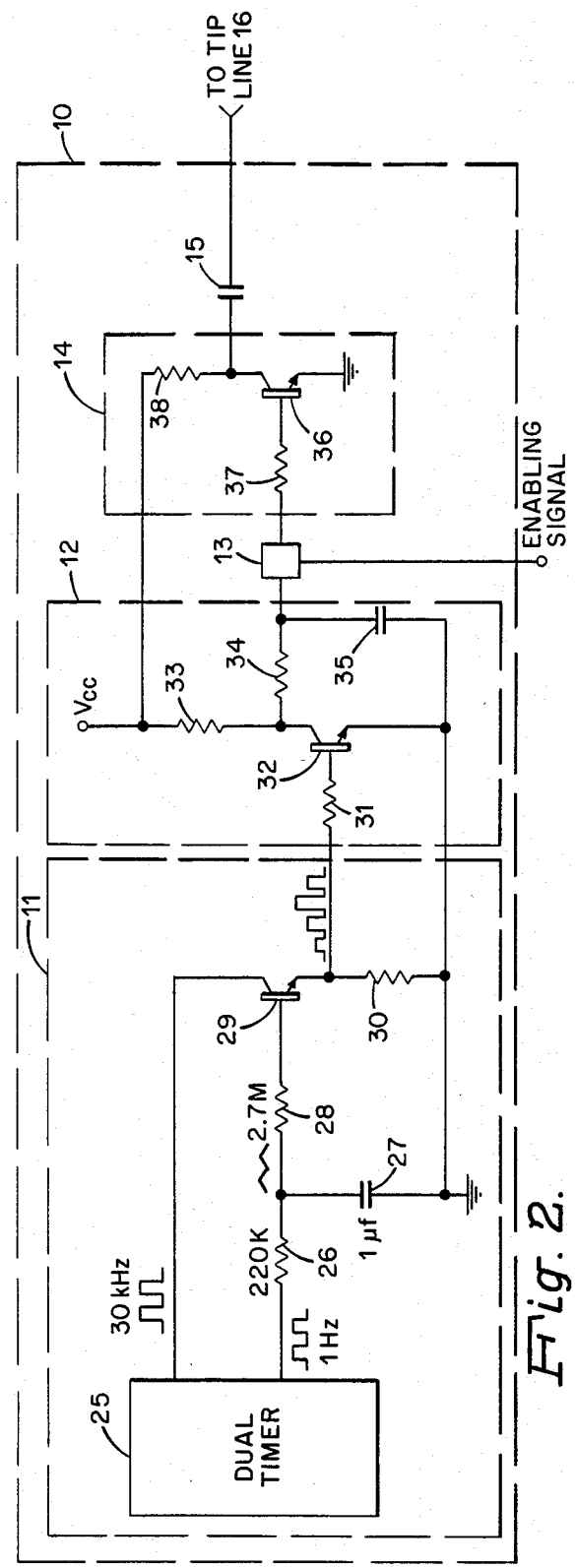
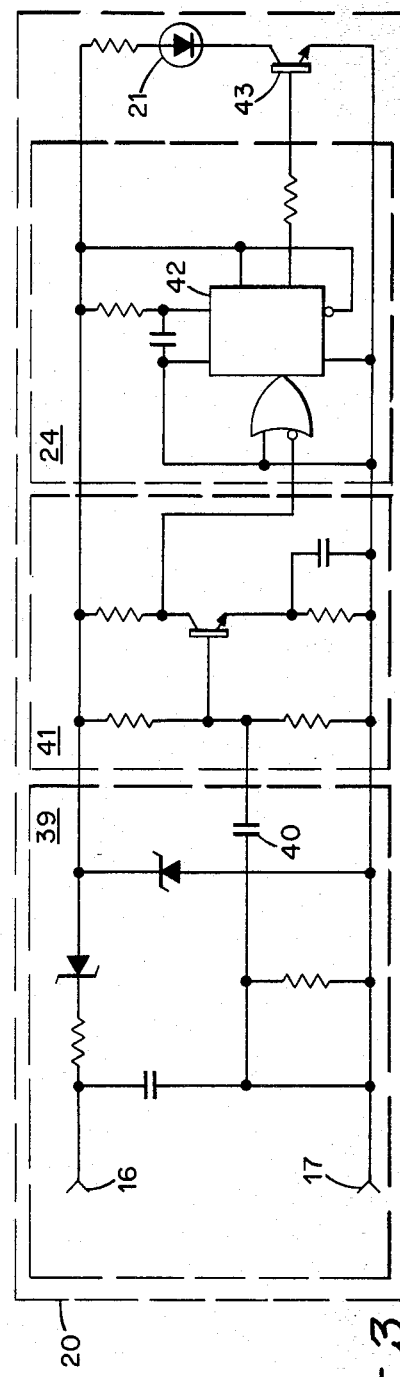
Fig. 2.
Fig. 3.

MESSAGE ALERT SYSTEM

BACKGROUND OF THE INVENTION

This invention pertains to telephone systems and, more particularly, is concerned with means for alerting a subscriber that a message is waiting.

Institutions such as corporations, hospitals, and hotels operate private automatic branch exchanges (PABX's) which switch calls both between individual phone handsets and with the public system.

A message intended for a subscriber may be manually or electronically recorded at a centralized or satellite message center. In order to alert the subscriber of a message each handset may include a so-called "message waiting" lamp which can be set by the message center to flash. Conceptually, perhaps the simplest way to light a "message waiting" lamp is to run for that purpose a pair of wires to the handset. Most telephone handsets are made with four wires leading out. Two of these wires are not normally connected to the phone system and could be used to carry current to a "message waiting" lamp. This technique is undesirable because of the costs of the extra pair of wires running from the handset and the associated installation costs.

Two wires are used to both transmit and receive. For historic reasons one wire is called the tip line and the other wire is called the ring line. It is preferable to use the tip or ring lines to light a "message waiting" lamp as opposed to providing special wiring. One known arrangement applies an 80 volt DC to the tip line to energize a neon lamp. The DC is actually a 1 Hz square wave to make the lamp flash. A mechanical relay located between the handset and the PABX disconnects the handset's tip line from the PABX when the lamp is energized. Such relays are prone to failure or subtract from the reliability of the system. Furthermore, the 1 Hz DC voltage can generate harmonics or cause interference on the lines.

Alternatively, it is known that lamp voltage may be obtained from a special ring signal from the PABX. This technique requires a close interface between the message center and the PABX.

SUMMARY OF THE INVENTION

According to one aspect of the invention, there is provided a "message waiting" lamp system for using with telephone handsets. A transmitter provides a carrier signal modulated at about one hertz. A gate connects the signal to a capacitor tapping the tip line of the handset. The handset has a receiver which separates the carrier from DC and demodulates the carrier. The resulting 1 hertz signal actuates the lamp to flash at 1 hertz.

BRIEF DESCRIPTION OF THE DRAWINGS

In the drawings:

FIG. 2 is a schematic representation of a transmitter circuit for use in the system of FIG. 1; and FIG. 3 is a schematic representation of a receiving circuit for use in the system of FIG. 1.

Figure 1:
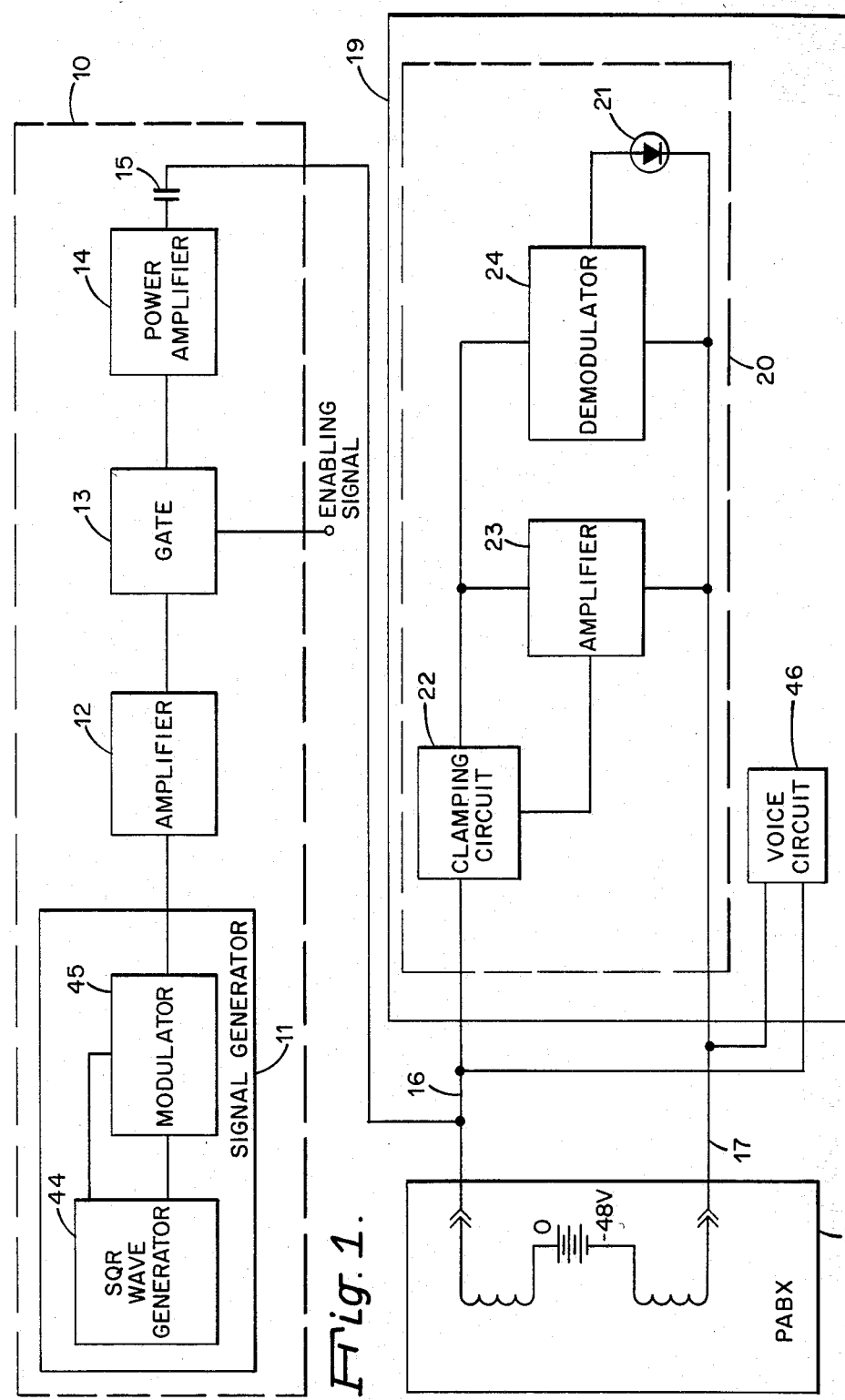
FIG. 1 is a block diagram of a "message wait" lamp system embodying the invention.

For a better understanding of the present invention, together with other and further objects, advantages and capabilities thereof, reference is made to the following disclosure and appended claims in connection with the above-described drawings.

DESCRIPTION OF THE INVENTION

A block diagram of a "message waiting" lamp system is seen in FIG. 1. Twisted wire pair phone systems have a design bandwidth of 4 KHz. As a feature of the invention a modulated out-of-band signal is applied to the tip line of a selected handset to activate a "message waiting" lamp. The frequency of the carrier signal is high enough to pass through DC blocking components such as capacitors, transformers, or amplifiers.

A transmitter 10 includes a signal generator 11 which provides a 30 KHz carrier signal modulated by a 1 Hz signal. Transmitter may include wave generator 44 and 1 Hz modulator 45. The modulated 30 KHz is coupled to amplifier 12 or from there coupled to the input of one or more analog gates 13. When a gate is enabled by a enabling signal from the message center, the signal is coupled by the gate to a power amplifier 14 and from there coupled through series capacitor 15 which is tapped to the tip line 16 of the handset to be signaled.

The tip line 16 and the ring line 17 may be a twisted pair of copper wires run between the PABX 18 and the handset 19. Forty-eight volts DC is maintained between lines 16, 17.

The handset 19 is equipped with a receiver circuit 20 for lighting a "message waiting" lamp 21 in response to a modulating signal. The receiver 20 includes a clamping circuit 22 to separate the signal from DC. An amplifier 23 amplifies the incoming signal. The amplified signal is then demodulated by demodulator 24 to obtain a 1 KHz square wave. The square wave causes the "message waiting" lamp 21 to flash at 1 Hz. The lamp 21 may be a light emitting diode.

The terms transmitter and receiver are not to be confused with the microphone and earphone found in the voice circuit 46 of the handset 19.

FIG. 2 is a schematic of circuitry suitable for implementing the transmitter 10. A dual timer 25, such as a type 556 integrated circuit, is adapted in a well-known manner to provide both a 30 KHz square wave and a 1 Hz square wave. Resistor 26 and capacitor 27 integrate the 1 Hz square wave to give a 1 Hz ramp waveform. The ramp waveform is coupled through resistor 28 to the base of transistor 29 which is arranged with resistors 28, 30 in a common collector configuration providing a high shunt impedance to capacitor 27. The transistor 29 modulates the 30 KHz signal in response to the 1 Hz ramp. The ramp is preferable to a square wave as it generates less of a "click" to the system.

The modulated 30 KHz signal is coupled through resistor 31 to the base of transistor 32 which is arranged in a common emitter configuration with resistor 33. The amplified signal is rounded by a low pass filter formed by resistor 34 and capacitor 35. The signal is next directed to the input of one or more analog gates 13 which may be a type 4116 integrated circuit. Each gate 13 corresponds to a handset. If a message is taken for the subscriber of a particular handset, the corresponding gate is turned on by an enabling signal. The modulated 30 KHz signal is then allowed to pass through the gate whereby it is amplified by a drive amplifier 14 comprised of transistor 36 arranged in a common emitter configuration with resistors 37 and 38 and then coupled through capacitor 15 to the tip line 16 of the specific handset. Drive amplifier 14 is unidirectional and helps isolate multiple tip lines.

FIG. 3 diagrams circuitry suitable for implementing receiver 20. A diode circuit 39 clamps incoming signals to ground, separating the signal from the 48 volt DC present between the lines. In the embodiment illustrated, circuit 39 includes a voltage regulator which obtains 5 volt DC from the 48 volt "voice battery" for powering the receiver circuitry. Alternately, DC power can be converted locally from AC line voltage or other sources.

The clamped 30 KHz signal is coupled through DC blocking capacitor 40 to a common emitter amplifier 41 with a preferred gain greater than 10 dB. The amplifier signal enters demodulator 24 and drives a TTL one shot circuit 42 such as a type 14528 integrated circuit, which in effect filters out the 30 KHz carrier and provides a 1 Hz square wave which turns switching transistor 43 on or off. The "message waiting" lamp 21 may be a light emitting diode (LED) connected in series with a collector of transistor 43. When a signal is sent the lamp flashes on or off to alert a subscriber of a "message waiting." The tip line 16 remains connected to the PABX allowing the handset to remain fully functional and negating a need of mechanical relay.

While there has been shown and described what is at present considered the preferred embodiment of the invention, it will be obvious to those skilled in the art that various changes and modifications may be made therein without departing from the scope of the invention as defined by the appended claims.

I claim:

1. A "message waiting" lamp system for use with a plurality of telephone handsets having individual tip and ring lines, said "message waiting' lamp system comprised of:

a. a transmitter including:
  a signal generator for providing an out-of-band carrier signal modulated with a modulating signal, wherein said modulating signal has a ramp waveform;
  a gate corresponding to each handset, and having an input coupled to the signal generator and an output, said gate arranged to turn on in response to an enabling signal;
  a capacitor tapping the tip line of a corresponding handset and coupled to the output of said gate; and b. a receiver located in proximity to a handset, including:
  means for separating the modulated carrier signal from DC voltage carried by the tip line;
  means for demodulating said signal and obtaining a square wave; and
  a lamp arranged to light in response to the square wave.

* * * * *